J. I. ELLIS.
ATTACHMENT FOR PLOWS.
APPLICATION FILED NOV. 16, 1908.
926,930.
Patented July 6, 1909.
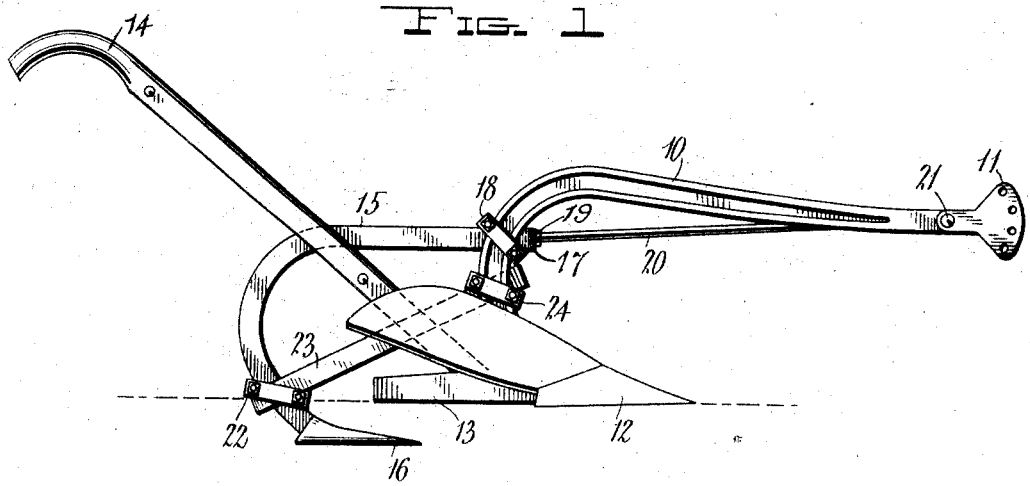
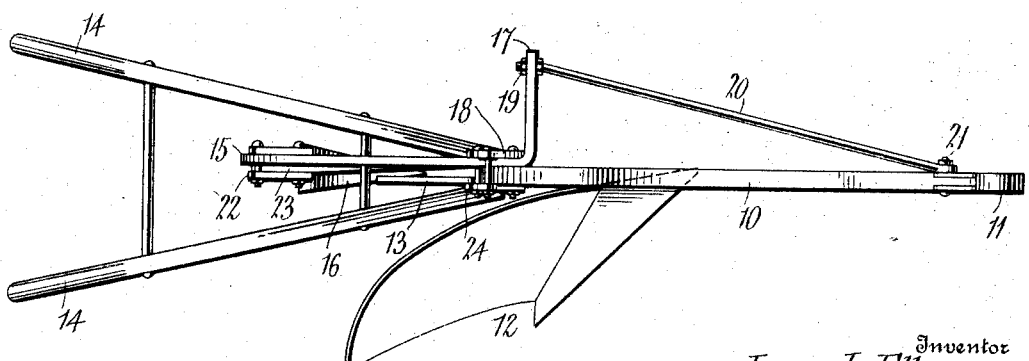
Witnesses
Inventor
James I. Ellis
By
Attorneys

UNITED STATES PATENT OFFICE.

JAMES I. ELLIS, OF MORRILLTON, ARKANSAS.

ATTACHMENT FOR PLOWS.

No. 926,930.  Specification of Letters Patent.  Patented July 6, 1909.

Application filed November 16, 1908. Serial No. 462,828.

*To all whom it may concern:*

Be it known that I, JAMES I. ELLIS, a citizen of the United States, residing at Morrillton, in the county of Conway, State of Arkansas, have invented certain new and useful Improvements in Attachments for Plows; and I do hereby declare the following to be a full, clear, and exact description of the invention, such as will enable others skilled in the art to which it appertains to make and use the same.

This invention relates to attachments for plows, more particularly to devices of this character employed for "sub-soiling", and has for one of its objects to provide a simply constructed device which may be readily attached to plows of various kinds, and adjustable thereon to control the depth to which the sub-soiler operates.

With this and other objects in view, the invention consists in certain novel features of construction as hereafter shown and described and then specifically pointed out in the claim, and in the drawings illustrative of the preferred embodiment of the invention, Figure 1 is a side elevation of a plow with the improvement applied. Fig. 2 is a plan view of the same.

The improved device may be readily applied without material modifications in the structure to plows of various kinds, but for the purpose of illustration is shown applied to a plow having an ordinary steel beam 10 with its clevis 11, mold board 12, landside 13 and handles 14. The improved attachment comprises a supplemental beam 15, preferably of steel and curving rearwardly and downwardly and provided at its lower end with a sub-soil plow element 16 of the usual construction. At its upper forward end the supplemental beam is provided with a laterally extending arm 17, and the supplemental beam is coupled to the plow beam 10 by a clip device 18. By this arrangement the arm 17 is rigidly supported in position and extends laterally of the beam 10, as shown. Connected at 19 to the arm 17 is a brace 20 with the opposite end of the brace coupled at 21 to the forward end of the beam 10, preferably near the clevis 11. The brace 20 coacting with the rigid lateral arm 17 of the supplemental beam 15 is an important feature of the invention—and performs two important and distinct functions. The rigid arm 17 extends at right angles to the beam 15 with its free end spaced from the main beam 10 and provides ready means for the attachment of the brace 20 with its rear end spaced a considerable distance from the main beam, and thus rigidly supports the rear end of the supplemental beam and supplements the coupling 18, so that the lateral strains to which the supplemental beam is subjected at its rear or operative end are resisted. The brace 20 being thus located obliquely to the longitudinal plane of the main beam 10 is in position to exert its holding force upon the lateral arm 17, and thus effectually support the supplemental beam.

The brace 20 being coupled at its forward end to the main beam 10, and spaced away from the main beam 10 at its rear end, likewise effectually braces the main beam, and prevents deflection thereof by any lateral strains to which it may be subjected. The brace 20 performs two important functions; namely, as a support to the supplemental beam and effectually preventing lateral movement thereof; and as a brace to the main beam 10 and effectually preventing deflection of the latter under any strains to which it may be subjected.

Connected at 22 to the supplemental beam 15, at a point between the coupling 18 and the plow 16 is another brace 23, the forward end of the brace 23 being coupled by a clip 24 to the main beam 10 below the coupling element 18, as shown. The couplings 18—24 are adjustable upon the main beam 10, so that the supplemental beam may be adjusted vertically, while at the same time by reason of the fact that the two coupling elements are independently arranged the brace 23 may be adjusted independently of the supplemental beam, to alter the position of the sub-soiler element relative to the mold board 12. By this means the depth of the "cut" of the sub-soiler may be adjusted as required.

It will thus be obvious that a simply constructed device is produced which may be readily attached to plows of various constructions without material change in the structure of either the plow or the attachment.

The improved device is simple in construction, can be readily applied to or detached from a plow, and does not interfere with the ordinary use of the plow.

What is claimed, is:—

The combination with a main plow beam of a supplemental beam having an arm extending laterally from its forward end, means for coupling said supplemental beam to the main plow beam, and a diagonally arranged brace connected at its rear end to the free end of the arm and connected at its forward end to the main beam at the forward end of the same.

In testimony whereof, I affix my signature, in presence of two witnesses.

JAMES I. ELLIS.

Witnesses:
T. M. MASON,
E. O. HAMON.